(12) United States Patent
Sullivan et al.

(10) Patent No.: US 9,654,575 B1
(45) Date of Patent: May 16, 2017

(54) PASS-THROUGH WEB TRAFFIC SYSTEMS AND METHODS

(71) Applicant: CROWDLY, INC., Boston, MA (US)

(72) Inventors: Daniel Sullivan, Hingham, MA (US); Scott Segel, Boston, MA (US); Ben Donaldson, Belmont, MA (US); Galen Sanford, Boston, MA (US)

(73) Assignee: Crowdly, Inc., Boston, MA (US)

( * ) Notice: Subject to any disclaimer, the term of this patent is extended or adjusted under 35 U.S.C. 154(b) by 0 days.

(21) Appl. No.: 15/238,880

(22) Filed: Aug. 17, 2016

Related U.S. Application Data

(63) Continuation of application No. 15/158,099, filed on May 18, 2016.

(51) Int. Cl.
*G06F 15/173* (2006.01)
*H04L 29/08* (2006.01)
*H04L 29/06* (2006.01)

(52) U.S. Cl.
CPC .............. *H04L 67/22* (2013.01); *H04L 67/02* (2013.01); *H04L 67/146* (2013.01); *H04L 67/42* (2013.01)

(58) Field of Classification Search
CPC ........................................................ H04L 67/22
USPC ........................................................ 709/224
See application file for complete search history.

(56) References Cited

U.S. PATENT DOCUMENTS

| | | | | |
|---|---|---|---|---|
| 2004/0177015 | A1* | 9/2004 | Galai | G06F 17/30864 705/35 |
| 2005/0038900 | A1* | 2/2005 | Krassner | G06Q 30/02 709/231 |
| 2005/0044139 | A1* | 2/2005 | Christian | G06Q 30/02 709/203 |
| 2006/0095558 | A1* | 5/2006 | Christian | H04L 29/12009 709/224 |
| 2009/0083155 | A1* | 3/2009 | Tudor | G06Q 30/0273 705/14.69 |

* cited by examiner

*Primary Examiner* — Hieu Hoang
(74) *Attorney, Agent, or Firm* — Parker Ibrahim & Berg LLC; James M. Behmke; Stephen D. LaBarron

(57) ABSTRACT

In one embodiment, a first server receives a webpage request for a first webpage address of a first webpage served by the first server. The first webpage address is associated with a second webpage served by a second server. The first server includes tracking code within data for the first webpage to record webpage transaction information for the client device. The first server includes a timer function for the tracking code in the data for the first webpage. The first server provides the data for the first webpage to the client device that includes the tracking code and the timer function. The timer function causes the client device to render the second webpage in response to the tracking code receiving a successful tracking status notification or in response to the tracking code not receiving a successful tracking status notification within a threshold amount of time.

20 Claims, 9 Drawing Sheets

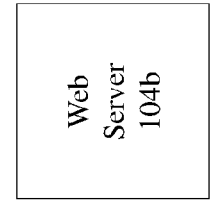
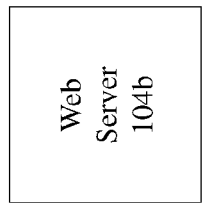
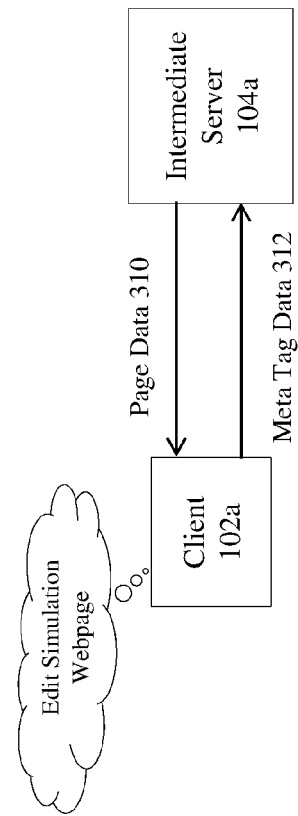
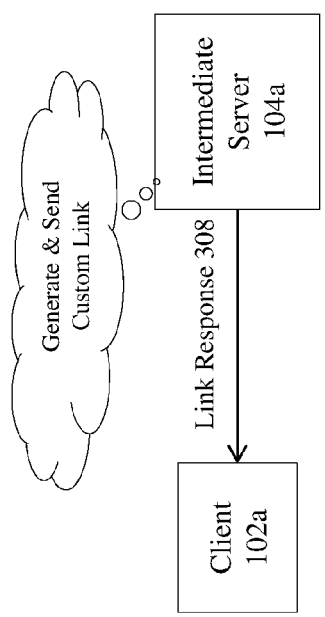
FIG. 3C
FIG. 3D

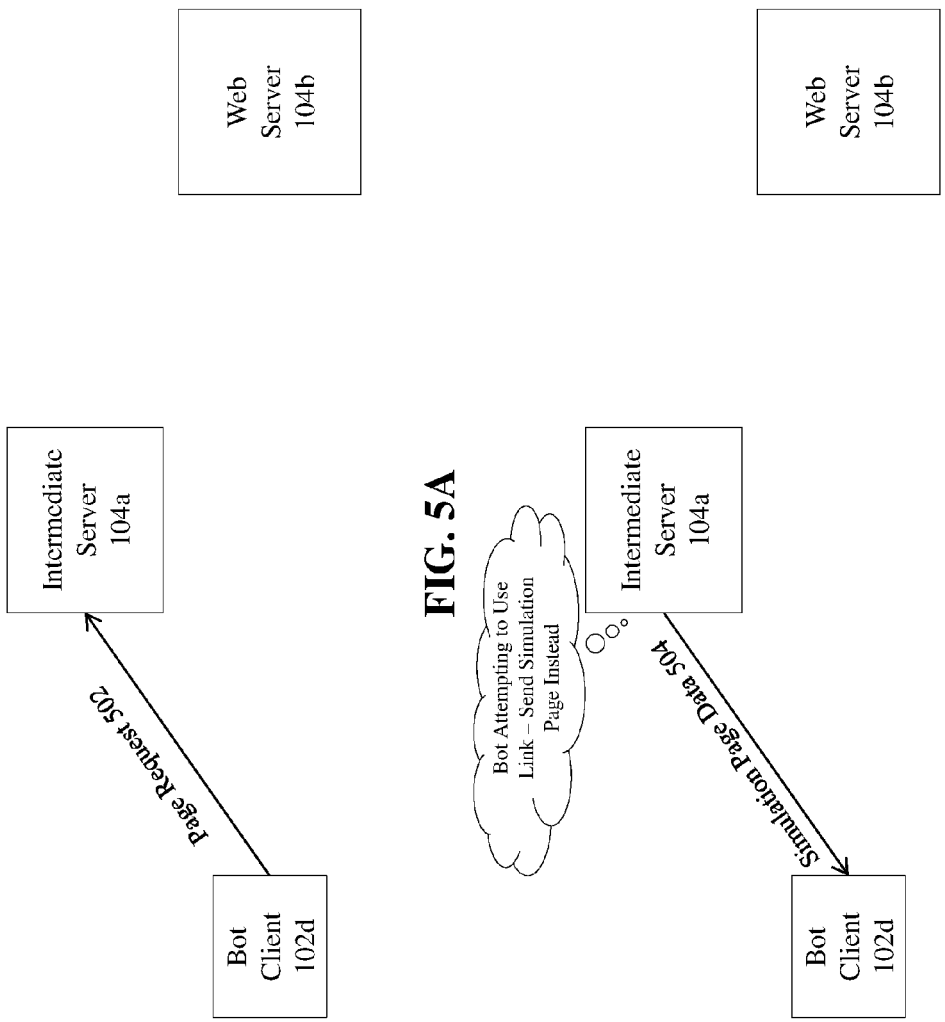

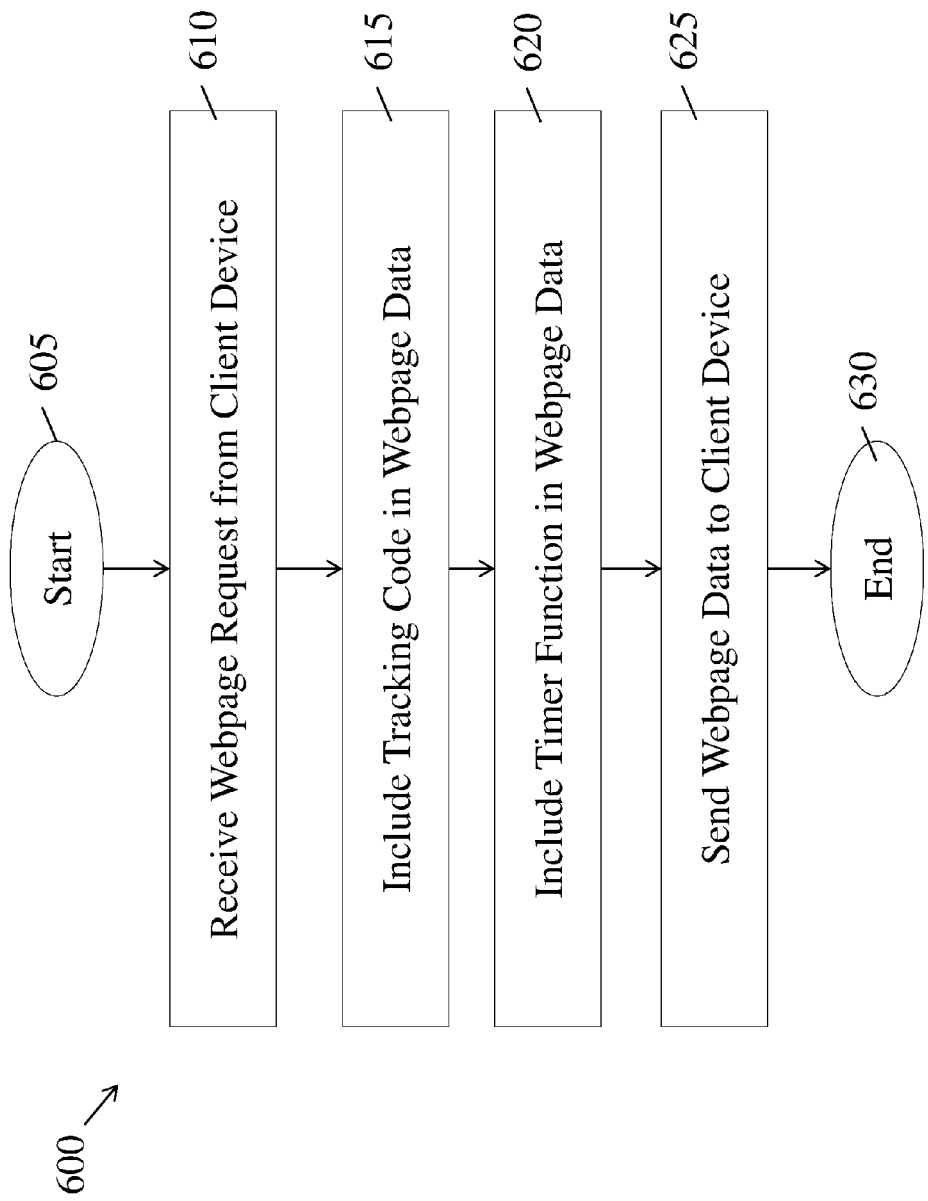

PASS-THROUGH WEB TRAFFIC SYSTEMS AND METHODS

RELATED APPLICATIONS

This application claims priority to U.S. patent application Ser. No. 15/158,099, filed on May 18, 2016, entitled "PASS-THROUGH WEB TRAFFIC SYSTEMS AND METHODS," by Sullivan, et al., the contents of which are herein incorporated by reference.

BACKGROUND

By its very nature, the Internet provides a certain degree of anonymity to Internet users. Notably, Internet users are not required to identify themselves before logging on to the Internet. Internet transactions are also not centrally recorded, making it difficult to piece together a user's online transactions across different websites and systems.

One prominent technology used to address the lack of a central recordation function in the Internet is a browser cookie. Generally, a browser cookie is a piece of data that a website can set on a user's browser, to store information about the user's transaction with the website. For example, a browser cookie may include login information, transaction state information, or other information that the browser passes back to the website during a given session. Using the returned cookie, the website is able to record transaction information as the user traverses different pages of the website.

Since cookies are tied to the domain/website of the issuer, their use as a recordation mechanism is limited across different websites. For example, assume that website A sets a browser cookie A' on the browser. In turn, website A is able to use browser cookie A' to record transaction information when the browser visits the various webpages of website A. However, if the user then navigates to website B, cookie A' will be unable to provide transaction information to website A regarding the visit to website B. Accordingly, the notion of a pixel tag was developed. Generally, a pixel tag is a link to an otherwise invisible image (e.g., a 1×1 pixel image) that is embedded into a webpage of interest. Continuing the above example, assume now that a webpage of website B includes a pixel tag linked to website A. Thus, when the browser loads the webpage of website B, the browser will also send an image request to website A, allowing website A to use cookie A' to record the browser's visit to the webpage of website B.

Challenges persist, however, to capture online transaction information in many other scenarios. For example, consider the case in which a browser follows a link from website C to D. If the transaction recording system is unaffiliated with one or both websites, it will not be able to capture information regarding this transaction.

SUMMARY

According to one or more embodiments of the disclosure, a first server receives a webpage request for a first webpage address of a first webpage served by the first server. The first webpage address is associated with a second webpage served by a second server. The first server includes tracking code within data for the first webpage to record webpage transaction information for the client device. The first server includes a timer function for the tracking code in the data for the first webpage. The first server provides the data for the first webpage to the client device that includes the tracking code and the timer function. The timer function causes the client device to render the second webpage in response to the tracking code receiving a successful tracking status notification or in response to the tracking code not receiving a successful tracking status notification within a threshold amount of time.

In a further embodiment, an apparatus is disclosed that includes one or more network interfaces to communicate with a computer network. The apparatus also includes a processor coupled to the one or more network interfaces and configured to execute a process. The apparatus additionally includes a memory configured to store the process executable by the processor. When executed, the process is operable to receive a webpage request for a first webpage address of a first webpage served by the apparatus. The first webpage address is associated with a second webpage served by a second server. The process is also operable to include tracking code within data for the first webpage to record webpage transaction information for the client device. The process is further operable to include a timer function for the tracking code in the data for the first webpage. The process is additionally operable to provide the data for the first webpage to the client device that includes the tracking code and the timer function. The timer function causes the client device to render the second webpage in response to the tracking code receiving a successful tracking status notification or in response to the tracking code not receiving a successful tracking status notification within a threshold amount of time.

In additional embodiments, a tangible, non-transitory, computer-readable media having software encoded thereon is disclosed. The software when executed by a processor of a first web server is operable to receive a webpage request for a first webpage address of a first webpage served by the first web server. The first webpage address is associated with a second webpage served by a second server. The software is further operable to include tracking code within data for the first webpage to record webpage transaction information for the client device. The software is also operable to include a timer function for the tracking code in the data for the first webpage. The software is additionally operable to provide the data for the first webpage to the client device that includes the tracking code and the timer function. The timer function causes the client device to render the second webpage in response to the tracking code receiving a successful tracking status notification or in response to the tracking code not receiving a successful tracking status notification within a threshold amount of time

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate examples of a server generating a custom web link;

FIGS. 5A-5B illustrate examples of a bot following a custom web link; and

FIG. 6 illustrates an example simplified procedure for sending webpage data to a client device.

DETAILED DESCRIPTION

Figure 1:
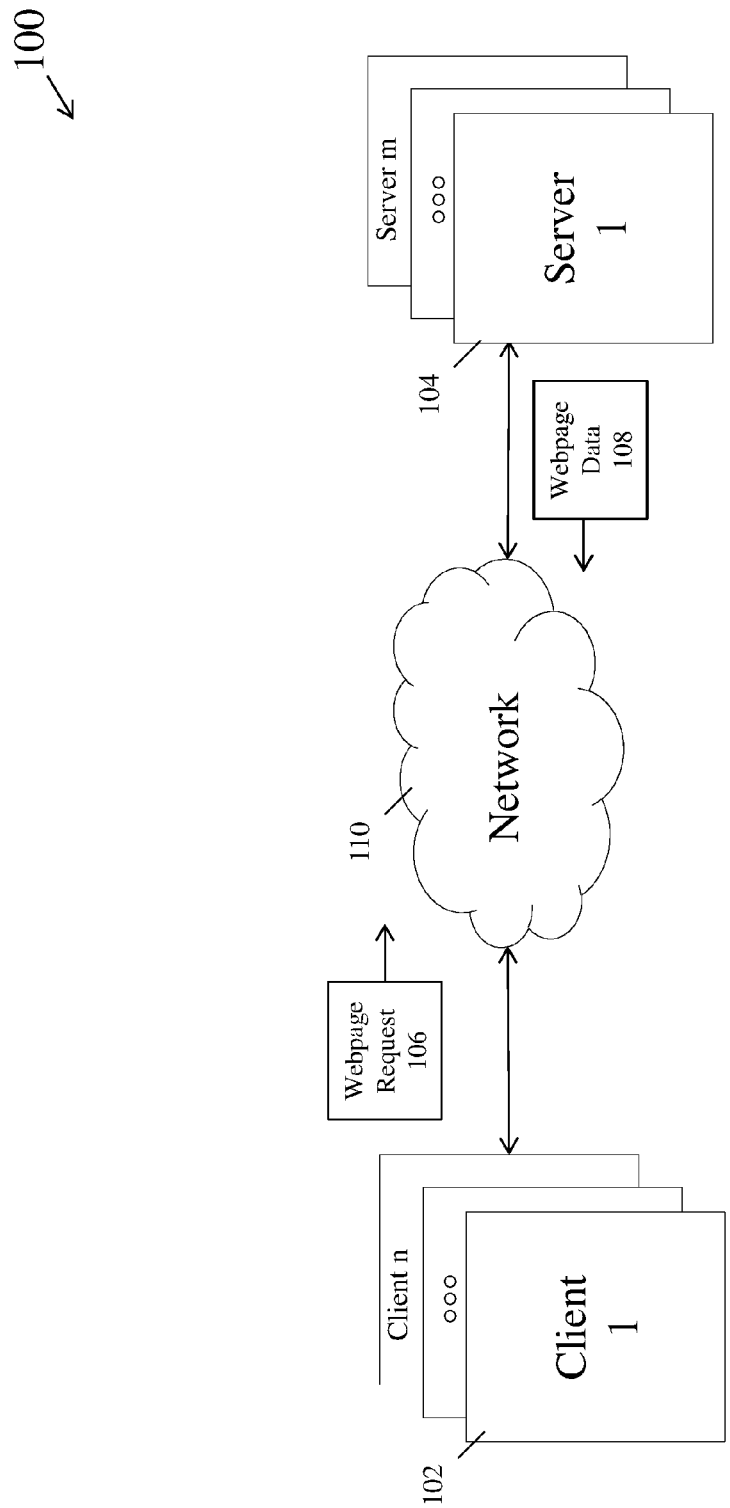
FIG. 1 illustrates an example computer system.

FIG. 1 is a schematic block diagram of an example computer system 100 illustratively comprising any number of devices in electronic communication with one another via a network 110. As shown, system 100 may include one or more client devices 102 (e.g., a first through $n^{th}$ client device) and any number of servers 104 (a first through $m^{th}$ server) in communication therewith via network 110. Those skilled in the art will understand that any number of nodes, devices, links, etc. may be used in computer system 100, and that the view shown herein is for simplicity. Also, those skilled in the art will further understand that while the system is shown in a certain orientation, system 100 is merely an example illustration that is not meant to limit the disclosure.

Network 110 may include any number of public networks, private networks, and/or direct connections between client device(s) 102 and server(s) 104. For example, network 110 may comprise the Internet, one or more wide area networks (WANs), local area networks (LANs), personal area networks (PANs), direct device communication links, combinations thereof, or other forms of data networks. Accordingly, network 110 may include any number of networking devices to facilitate data communications between client device(s) 102 and server(s) 104 in system 100. For example, network 110 may include any number of wireless transceivers, routers, switches, servers, etc., to forward data packets between any of client device(s) 102 and server(s) 104 (e.g., between different clients, between different servers, between a particular client and particular server, etc.).

Network 110 may further include any number of wired and/or wireless links between endpoint or intermediate devices. For example, a first client device 102 may communicate wirelessly with a cellular substation that is hardwired to a data center that houses a first server 104. Example communication protocols that may be used in network 110 may include, but are not limited to, cellular protocols (e.g., GSM, CDMA, etc.), wireless protocols (e.g., WiFi, Bluetooth®, etc.), wired protocols (e.g., Ethernet, etc.), transport layer protocols (e.g., TCP, UDP, etc.), Internet layer protocols (e.g., IPv4, IPv6, etc.), or the like.

Client device(s) 102 may include any number of consumer electronic devices configured to communicate via network 110. For example, client device(s) 102 may include, but are not limited to, cellular phones, tablet devices, laptop devices, desktop devices, wearable devices (e.g., smart watches, heads up display devices, etc.), integrated vehicle electronics, set top devices, smart televisions, and the like.

Server(s) 104 may include any number of computing devices configured to provide web-based services to client device(s) 102. Server(s) 104 may include, for example, rack-based systems, cloud-based systems, desktop servers, or any number of other forms of computing devices configured to provide data on request from a client device 102.

Client device(s) 102 and server(s) 104 may include any number of user interfaces to receive input from a user and/or convey sensory information to a user. For example, client device(s) 102 and/or server(s) 104 may include displays, speakers, microphones, keyboards, touch-based inputs, or any other user interfaces. As would be appreciated, a particular user interface may be integrated directly into client device(s) 102 or server(s) 104 or, alternatively, in direct communication therewith (e.g., an external monitor, an external speaker, etc.).

In various embodiments, server(s) 104 may include webpage servers configured to provide webpage data to client device(s) 102 on request. For example, as shown, assume that a particular one of client device(s) 102 sends a webpage request 106 to a particular one of server(s) 104. In such a case, webpage request 106 may include a Hypertext Transfer Protocol (HTTP) GET header for a particular hyperlink/ universal resource locator (URL). As would be appreciated, client device 102 may perform a lookup of the address of server 104 via a domain name system (DNS) to resolve a domain name (e.g., foo.test) into a corresponding IP address.

In response to receiving webpage request 104, the receiving server 106 may retrieve and send the requested webpage data 108 back to the requesting client device 102. Webpage data 108 may include, for example, HyperText Markup Language (HTML) data, Extensible Markup Language Data (XML) data, script code (e.g., JavaScript™, etc.), or the like, that a web browser application of client device 102 may process to display the webpage on an electronic display of client device 102. As would be appreciated, a web browser may be a stand-alone application configured to retrieve and present web pages or another application that includes this functionality. Webpage data 108 may also include any number of tags or other instructions that cause the web browser to request additional webpage data, either from the same server 104 or a different server 104. For example, if webpage data 108 includes an HTML image tag, client device 102 may send a separate request to retrieve the corresponding image from the location indicated by the tag. In turn, the web browser may display the retrieved image according to the instructions in webpage data 108 (e.g., instructions that control the location, size, etc. of the image on the display).

Figure 2:
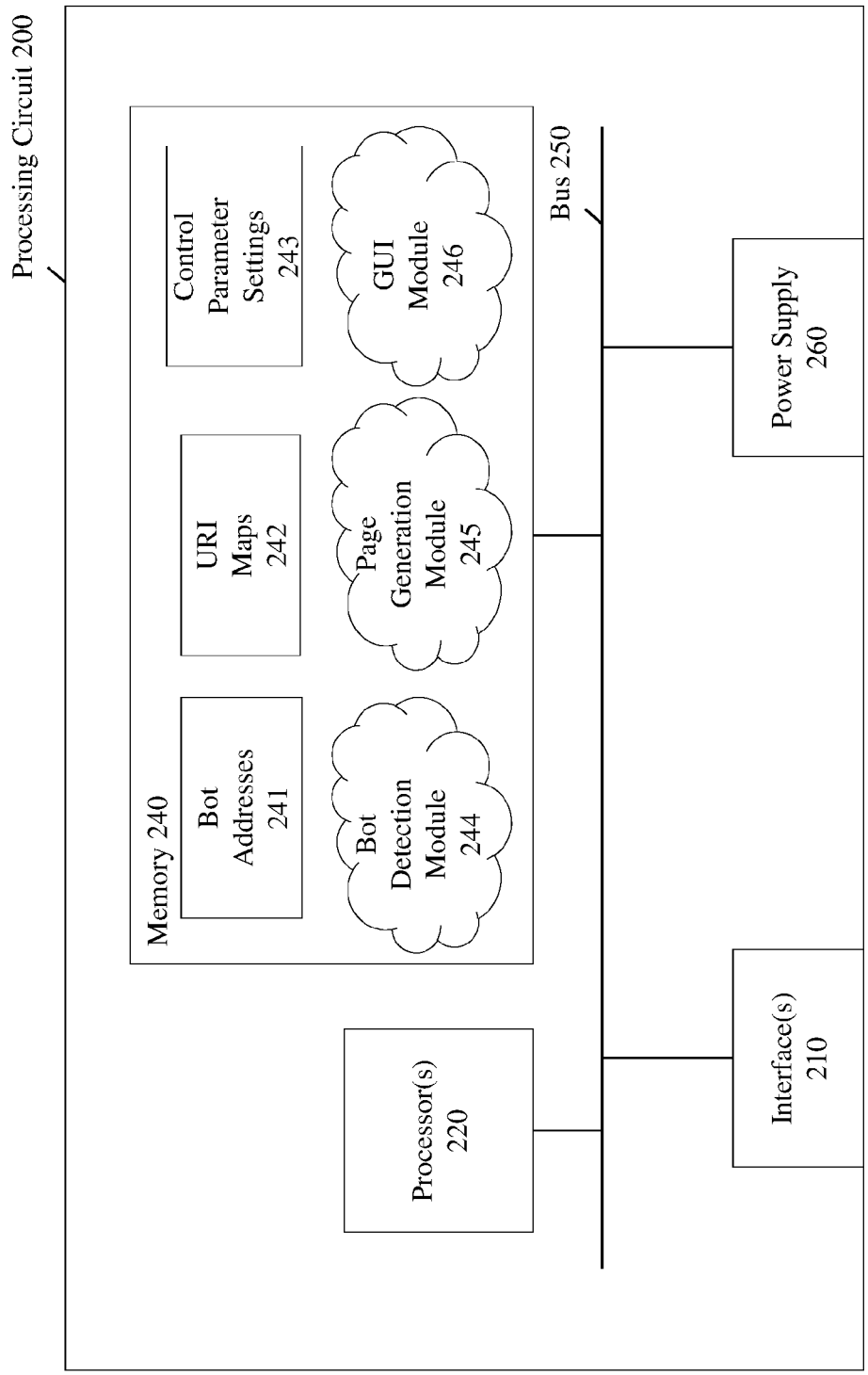
FIG. 2 illustrates an example processing circuit 200.

FIG. 2 is a schematic block diagram of an example processing circuit 200 that may be used with one or more embodiments described herein, e.g., as part of server(s) 104 shown in FIG. 1 above. In general, processing circuit 200 may comprise one or more network interface(s) 210 (e.g., wired interfaces, wireless interfaces, etc.), at least one processor 220, and a memory 240 interconnected by a system bus 250, as well as a power supply 260 (e.g., battery, plug-in, etc.).

The network interface(s) 210 may include the mechanical, electrical, and signaling circuitry for communicating data via network 110. The network interfaces may be configured to transmit and/or receive data using a variety of different communication protocols. Note, further, that the nodes may have different types of network connections, e.g., wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Memory 240 may include, for example, persistent memory (e.g., one or more hard drives, etc.) and/or non-persistent memory (e.g., RAM, etc.) that may store software instructions and associated data for processing by the processor(s) 220. In other words, memory 240 is shown collectively for purposes of illustration and may comprise any number of physical data storage devices.

Processor(s) 220 may comprise hardware elements or hardware logic that execute the software programs stored in memory 240 and manipulate the data stored in memory 240.

For example, as shown, memory 240 may store a bot detection module 244, a page generation module 245, and/or a GUI module 246 for execution by processor(s) 220. While modules 244-246 are shown separately, the operations of modules 244-246 may be integrated into one another or may be separated into additional modules, as desired.

Further, while modules 244-246 are shown stored in memory 240, modules 244-246 may be stored and executed in a distributed manner by any number of different processing circuits, in other embodiments. When executed by processor(s) 220, modules 244-246 may cause processor(s) 220 to store and/or manipulate stored information, such as bot addresses 241, URL maps 242, and/or control parameters 243. It will be apparent to those skilled in the art that other processor and memory types, including various computer-readable media, may be used to store and execute program instructions pertaining to the techniques described herein. For example, in some cases, memory 240 may comprise a compact disk ROM (CD-ROM), removable storage device, or the like.

In general, bot detection module 244 may be configured to determine whether a webpage request is sent by a client device (e.g., client device 102) operated by a human user or an automated bot. Notably, many webpage requests are sent by automated programs such as search engine bots, web archive bots, bots that generate webpage previews, and the like. For example, a search engine bot may crawl a hyperlink to gather information about the corresponding webpage (e.g., the content of the webpage, etc.), so that the webpage can be added to the search index. In some cases, the bot may also capture at least a portion of the webpage data for purposes of generating webpage previews. For example, a search engine may display the first few lines of an online article from a crawled webpage. As used herein, "artificial web traffic" refers to web traffic that result from automated webpage requests.

Bot detection module 244 may use any number of different techniques, to determine whether a webpage request is bot-generated. In one embodiment, bot detection module 244 may compare the source address of a webpage request to known bot addresses stored in bot addresses 241. For example, if a particular web crawler bot of a particular search engine sends webpage requests from a given IP address, and the IP address is included in bot addresses 241, bot detection module 244 may determine that a webpage request received from the address is bot-generated. Bot addresses 241 may be predefined (e.g., by an administrator), based on address lookups (e.g., if an address is registered to the domain of a known search engine, etc.), and/or dynamically updated. In further embodiments, bot detection module 244 may detect a bot based on client-reported user agents. In some embodiments, bot detection module 244 may use machine learning to update bot addresses 241 based on the behavior of a given client device (e.g., the contents of its webpage requests, the timing of its webpage requests, etc.).

In various embodiments, page generation module 245 may be configured to generate custom webpages and corresponding webpage addresses/uniform resource indicators (e.g., URLs, etc.)/hyperlinks. In some embodiments, page generation module 245 may generate a custom link and webpage, in response to receiving a destination address of another webpage, as described in greater detail below. For example, a user may specify a link to webpage A and, in turn, page generation module 245 may generate a custom webpage B and corresponding link to webpage B. As shown, page generation module 245 may maintain URI maps 242 between the destination webpage addresses and the custom webpage addresses generated by page generation module 245.

In some embodiments, page generation module 245 may be configured to include various scripts or other instructions into the webpage data for a custom generated webpage. For example, if page generation module 245 generates a custom webpage B for a destination webpage A, page generation module 245 may include tracking code in the code for custom webpage B. When processed by the web browser of the client, such code may cause the web browser to perform a tracking handshake, prior to redirecting the browser to the destination webpage A. In further embodiments, page generation module 245 may include a timer function for the tracking code that causes the browser to redirect after a set amount of time, if the tracking code is unable to perform a tracking handshake within a set amount of time.

In further embodiments, page generation module 245 may be configured to generate a pseudo-/simulation webpage that mimics certain aspects of the destination webpage specified by the user. For example, if a user requests a custom webpage for a webpage A, page generation module 245 may generate a custom webpage B and/or a simulation webpage C that comprises a representation of webpage A. In various embodiments, page generation module 245 may selectively provide a webpage based on whether the requestor is a human user or a bot, as determined by bot detection module 244. For example, if a bot sends a webpage request to processing circuit 200, page generation module 245 may return webpage data that includes an altered representation of the destination webpage A. However, if a human user sent the request, page generation module 245 may return a pass-through webpage (e.g., a webpage that is rendered for a very short period of time from the user's perspective) that eventually directs the browser to the destination webpage A.

GUI module 246 may be configured to provide a local or remote GUI to a user of processing circuit 200 (e.g., via one or more control webpages, via an application, etc.). For example, GUI module 246 may provide a GUI to a display that allows a user to request a custom link for a given destination website. In further embodiments, GUI module 246 may be configured to allow the user to control the generation of custom webpages and custom hyperlinks by processing circuit 200 by specifying control parameter settings 243. For example, GUI module 246 may be configured to allow the user to input a desired amount of wait time for the timer function, customize the representation of the destination webpage provided to bots, etc.

As noted above, there are many situations that prevent an interested party from recording information about online transactions. For example, if the interested party is unaffiliated with both the source and destination webpages for a given link, the interested party will not be able to record when users click the link or otherwise distinguish between users. In particular, there is no uniform way to place a tracking cookie on pages that are not owned by, and are unaffiliated with, the interested party. In various embodiments, the techniques herein propose a pass-through mechanism in which web traffic is diverted through an intermediate server affiliated with the interested party, so that the intermediate server can record online navigations between unaffiliated webpages.

Figure 3A:
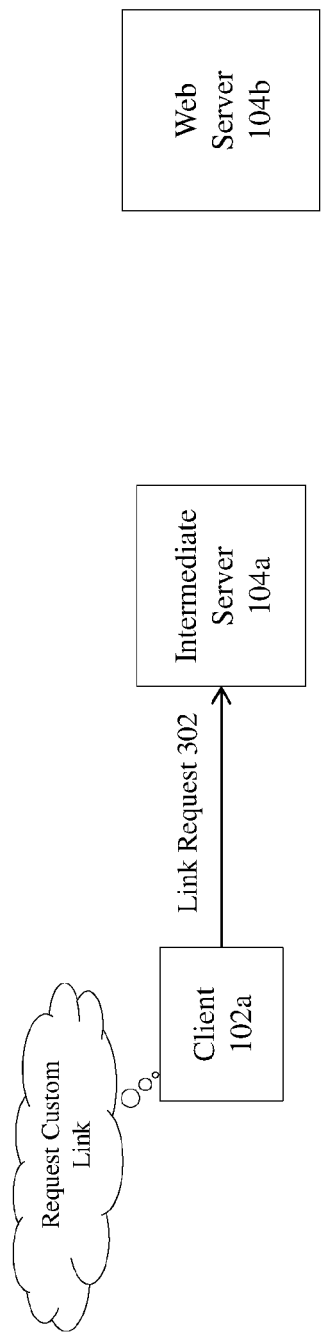

FIGS. 3A-3D illustrate examples of a server generating a custom web link, according to various embodiments. As shown in FIG. 3A, assume that the user of client device 102a wishes to record when users navigate to a certain page served by web server 104b. However, the user is unaffiliated with the destination webpage and may or may not be affiliated with the webpage(s) that link to the webpage served by web server 104b.

In various embodiments, client device 102a may send a link request 302 to an intermediate server 104a (e.g., a server comprising processing circuit 200) for a custom link/webpage address for the destination webpage. Link request 302 may include the webpage address of the destination webpage served by web server 104b for which the user of client device 102a wants to record user visits. For example, assume that web server 104b is a video upload service and that the particular destination webpage of interest has the address of http://www.videoservice.test/123456.html. In such a case, the user of client device 102a may specify this web address as part of link request 302 and the destination webpage may include one or more embedded media files (e.g., video, image, audio, etc.).

Figure 3B:
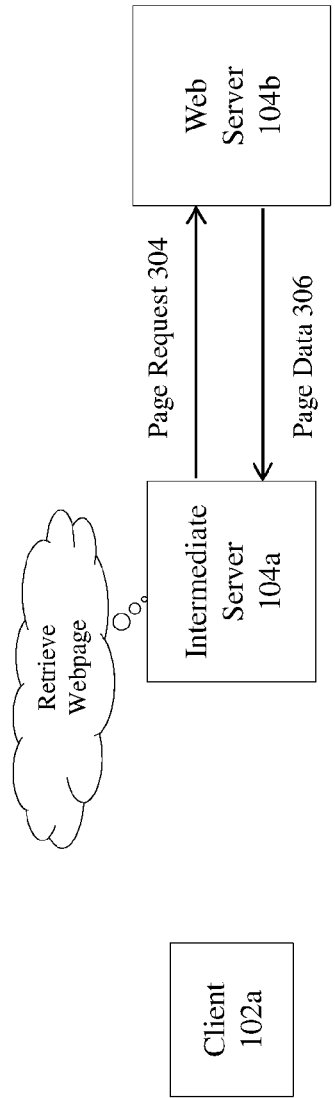

As shown in FIG. 3B, intermediate server 104a may send a page request 304 for the web address specified in link request 302 to the corresponding web server, web server 104b. For example, page request 304 may be an HTTP GET request for the web address http://www.videoservice.test/123456.html. In response, web server 104b may return page data 306 for the webpage requested via page request 304. As would be appreciated, intermediate server 104a may send any number of subsequent requests to web server 104b and/or any number of other web servers, to retrieve the corresponding webpage.

In FIG. 3C, intermediate server 104a may generate a custom webpage address/link for the webpage served by web server 104b. In general, a custom webpage address/link refers to a webpage address/link that will ultimately direct a user's browser to the destination webpage, but first passes the web traffic first through an intermediate webpage served by intermediate server 104a. In other words, intermediate server 104a may generate a new webpage and corresponding webpage address for association with the destination web address. For instance, continuing the above example, intermediate server 104a may make the following association:

TABLE 1

| Destination Web Address | Custom Web Address |
| --- | --- |
| http://www.videoservice.test/123456.html | http://www.server104a.test/custom1.html |

Once the custom web address is generated, intermediate server 104a may return the custom address/link to client device 102a via a link response 308. In some embodiments, intermediate server 104a may further leverage a URL shortening service, to return a shortened version of the custom web address as part of link response 308.

Automated bots present additional challenges when attempting to record traffic for a non-owned/unaffiliated webpage. Notably, many automated bots copy at least a portion of the webpage, to present a preview of the webpage to user. For example, a search engine may crawl a webpage to learn the contents of the webpage and present a preview of the webpage to users.

In various embodiments, as described above, intermediate server 104a may be configured to determine whether a request for the custom webpage address is bot-generated or initiated by a human user (e.g., by executing bot detection module 244). One potential approach to bot-generated requests for the custom web address would be to return an entirely blank webpage that does not redirect to the destination webpage, in response to receiving a bot-generated request. In doing so, the content of the destination webpage will be concealed from the bot in order to ensure bots cache the custom web address, and prevent bots from caching the end destination address. However, doing so will also prevent the search engine or other service from garnering any information at all about the destination webpage.

As shown in FIG. 3D, intermediate server 104a may further communicate with client device 102a to control what is presented to automated bots when navigating the custom link. In some embodiments, intermediate server 104a may be configured to present a webpage to bots that simulates at least a portion of the content of the destination webpage. For example, intermediate server 104a may scrape and store metadata from the destination webpage and provide the metadata in response to any bot-initiated requests for the custom web address. In some embodiments, as shown, intermediate server 104a may be further configured to allow the user of client device 102a to control the webpage contents. For example, intermediate server 104a may provide page data 310 for the destination webpage to client 102a. In turn, client device 102a may return meta tag data 312 for presentation to a bot and/or as part of the custom webpage sent to human users.

Figure 4A:
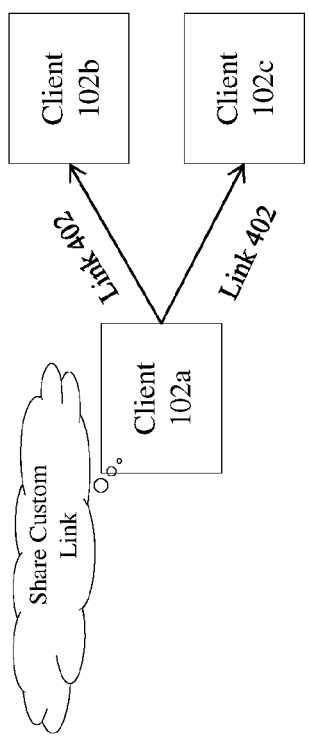
FIGS. 4A-4E illustrate examples of a client device following a custom web link.

FIGS. 4A-4E illustrate examples of a client device following a custom web link, according to various embodiments. As shown in FIG. 4A, after receiving the custom web address/link from intermediate server 104a, client device 102a may share the custom link 402 with any number of other client devices, such as client devices 102b-102c. For example, the user of client device 102a may post custom web address/link 402 on a social media website accessed by client devices 102b-102c, send link 402 via text or email message to client devices 102b-102c, etc. In further embodiments, link 402 may be a shortened link from a URL shortening service for the custom address generated by intermediate server 104a.

Figure 4B:
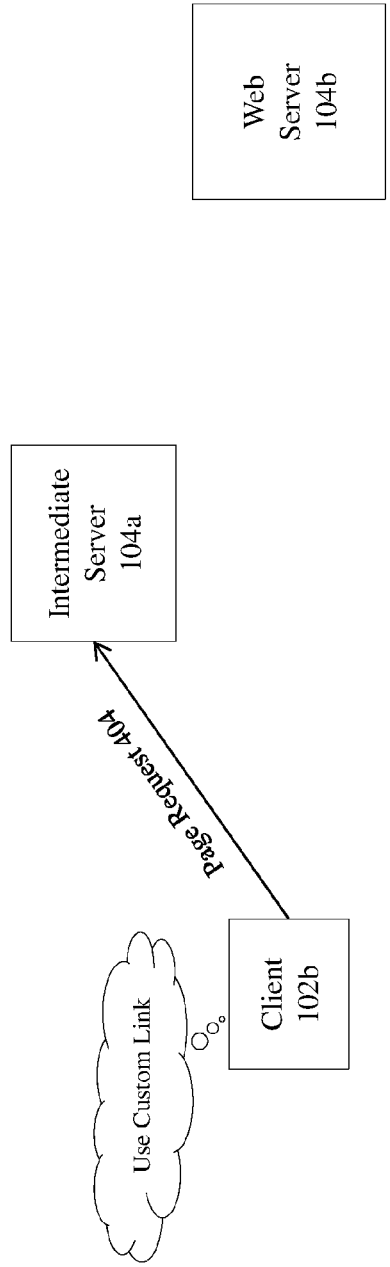

In FIG. 4B, assume that the user of client device 102b clicks on custom link 402 in his or her web browser application. In response, the browser may send a page request 404 to the custom web address generated by intermediate server 104a for the destination webpage served by web server 104b. As would be appreciated, if a URL shortening service is used, clicking the shortened address will result in client device 102b being redirected to the custom web address generated by intermediate server 104a.

Figure 4C:
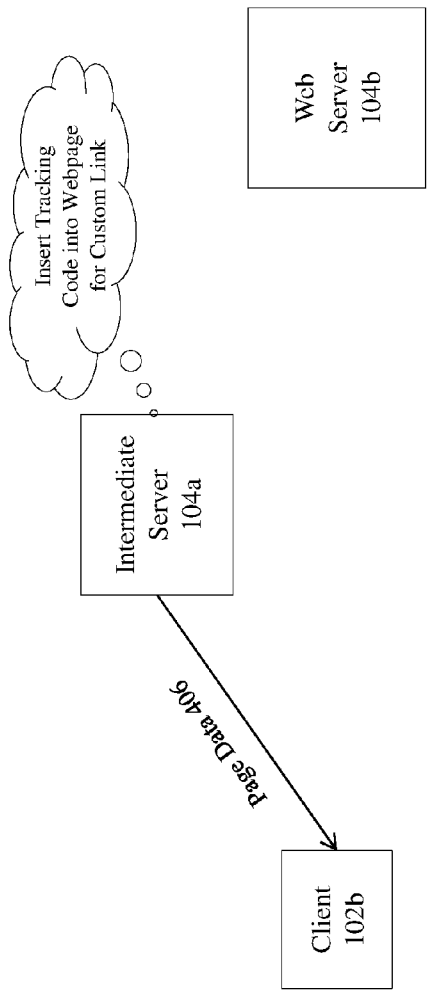

As shown in FIG. 4C, in response to receiving web page request 404, intermediate server 104a may determine whether or not page request 404 was bot-initiated or initiated by a human user of client device 102b. If intermediate server 104a determines that client device 102b is human-operated, intermediate server 104a may provide page data 406 for a custom generated webpage back to client device 102b.

Figure 4D:
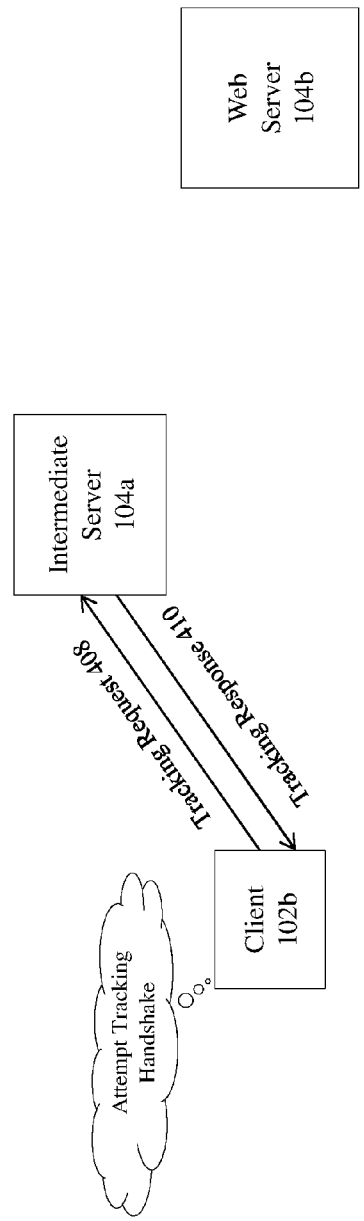

In various embodiments, intermediate server 104a may include tracking code in page data 406 that causes client device 102b to perform a tracking handshake with intermediate server 104a or another device. For example, as shown in FIG. 4D, the browser of client device 102b, in response to processing webpage data 406, may send a tracking request 408 to intermediate server 104a or another server. In some cases, tracking request 408 may be for one or more tracking pixels/images for inclusion on the custom webpage associated with page data 406. As would be appreciated, such pixels/images may be essentially invisible to the user, but allow the server receiving the pixel/image request to set a corresponding cookie via its response. For example, intermediate server 104a or any other server(s) 104 that receive tracking request 408 may set one or more cookies on client device 102b via a tracking response 410.

From the perspective of the user of client device 102b, the user may believe that he or she is navigating to the destination webpage served by web server 104b when, in fact, the user is navigating to the custom webpage served by intermediate server 104a. Thus, the user is likely to notice the loading of the intermediate webpage unless the destination webpage of web server 104b is loaded quickly (e.g., on the magnitude of seconds, if not less). For example, even if the custom webpage served by intermediate server 104a appears blank when rendered by the web browser of client device 102b, the user may view the blank screen and believe that the destination webpage is having difficulty loading.

Figure 4E:
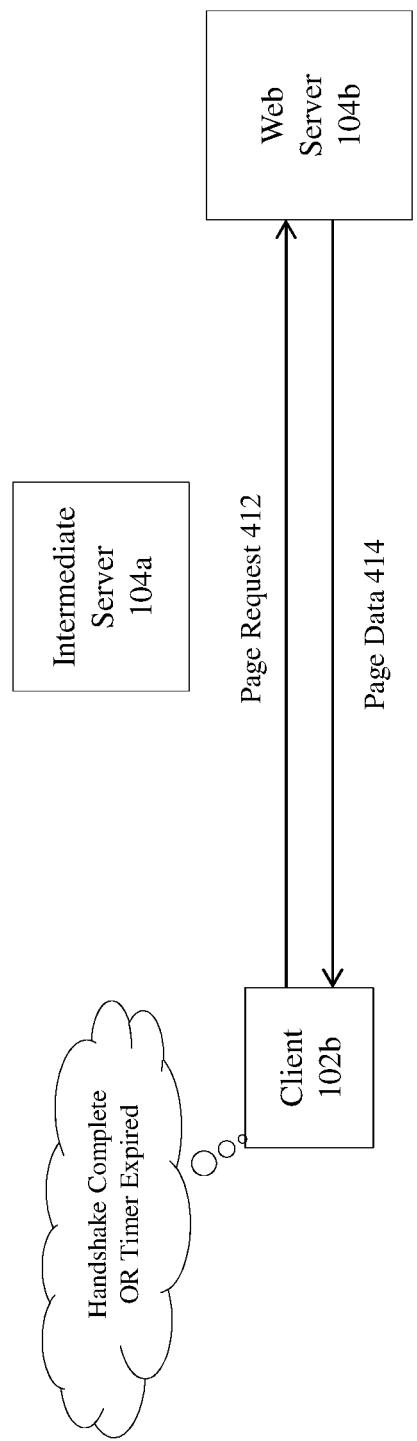

As shown in FIG. 4E, after attempting one or more tracking handshakes, webpage data 406 may cause the browser application to send a page request 412 for the destination webpage served by web server 104b. In various embodiments, the tracking code included in webpage data 406 may cause client device 102b to load the destination webpage under any or both of the following conditions: 1.) the browser receives tracking response 410, and/or 2.) the browser fails to receive tracking response 410 within a predefined amount of time. In other words, in some embodiments, intermediate server 104a may include a timer function in page data 406 that is associated with the tracking code and causes the browser to load the destination webpage of web server 104b under either of the above conditions.

An example timing function is provided below:

```
if (trackingCode.push(['track', 'Activated', { }]))
{
trackingCode.activated = true;
}
/* This keeps track of how many times we've checked if the tracking request has been successfully sent */
var attempts = 0;
/* We check every 50 milliseconds. Could be more often as we don't incur any cost by checking */
var interval = 50;
/* We want to wait a maximum of approximately two seconds for the tracking request to be sent, to avoid degrading the end-users' experiences */
var max_attempts = 2000 / interval;
    (function checkLoaded( ) {
      setTimeout(function ( ) {
        if((trackingCode.activated&& attempts > 1) || attempts > max_attempts) {
          top.location.href='<destination url>'
        }else{
          attempts += 1;
          checkLoaded( );
        }
    }, interval);
})( );
```

As would be appreciated, the above code is provided herein for illustrative purposes only and can be adapted as desired. For example, the above timer function may be implemented using any number of different languages and may use any desired number of retries or timeout interval.

In response to page request 412, web server 104b may return page data 414 for the destination webpage to client device 102b, thereby causing the browser to render the destination webpage. As would be appreciated, page data 414 may cause client device 102b to retrieve any number of files, scripts, etc. via multiple requests, if needed. If client device 102b performed a tracking handshake due to the loading of the custom webpage from intermediate server 104a, this information may allow the interested party to track or otherwise record the online actions performed by the user of client device 102b.

FIGS. 5A-5B illustrate examples of a bot following a custom web link, according to various embodiments. In many cases, it may be undesirable to allow an automated bot to traverse the custom webpage in the same manner as that of a human user. For example, as noted, it may be desirable to control what information is captured by a search engine or any other automated bot regarding the destination webpage for purposes of generating a webpage preview. Thus, in some embodiments, the system may return different webpage data to a client device, depending on whether the client device is operated by a human user or by an automated bot.

In FIG. 5A, assume that a bot-operated client device 102d sends a webpage request 502 for the custom web address/link generated for client device 102a and described previously with respect to FIGS. 3A-3D. In response, intermediate server 104a may first determine whether or not webpage request 502 was human-initiated or bot-initiated. For example, intermediate sever 104a may compare the IP address of client device 102d to a list of known bots or perform other functions to make this assessment. In another example, the system may use client-returned user agents, to distinguish human-generated requests and bot-generated requests.

As shown in FIG. 5B, if intermediate server 104a determines that webpage request 502 was bot-initiated, intermediate server 104a may return webpage data 504 that differs from that of the custom webpage served to human-operated clients. Generally speaking, this webpage data may be based on a pre-fetched version of the destination webpage, as described previously with respect to FIG. 3B. Intermediate server 104a may cache this data and, in some embodiments, enable editing of the pre-fetched cache data. For example, as described previously with respect to FIG. 3D, the user that requested generation of the custom web address/link may edit the metadata tags or other content of webpage data 504, to control what information is returned to automated services.

In further embodiments, intermediate server 104a may return the same webpage code to a client device 102, regardless of whether the webpage request was bot-initiated or human-initiated. In one embodiment, intermediate server 104a may include a programmatic bot check within the code of the pass-through webpage, to determine whether client device 102b is operated by a bot. If so, the webpage code may only activate the tracking code and timer, if the bot check determines that client device 102b is human operated. Said differently, the webpage code for the pass-through webpage may leverage a user agent, to determine whether the executing client device is bot-operated and cause the browser application to perform different functions, accordingly.

FIG. 6 illustrates an example simplified procedure for sending webpage data to a client device, in accordance with the embodiments herein. In general, procedure 600 may be performed by a processing circuit (e.g., circuit 200) of a web server in communication with a network. Procedure 600 may start at step 605 and continues on to step 610 where, as described in greater detail above, the server may receive a webpage request from a client device. In various embodiments, the webpage request may be for a first webpage address of a webpage served by the web server. In addition, the first webpage address may be associated with a second webpage address of a destination webpage. For example, the webpage request may be for a custom webpage address/link that the web server generated for a destination webpage served by a different server.

At step 615, as detailed above, the web server may include tracking code in webpage data for the requested webpage address. In various embodiments, the tracking code may cause the browser processing the webpage data to perform a tracking handshake with one or more servers. In one embodiment, a tracking handshake may be operable to place one or more cookies on the client device that can be used to record subsequent online actions performed by the client device. Notably, the webpage data returned to the client device may include one or more pixel tags that cause the browser to send out image requests via which cookies may be set in the browser. These images may be configured to be effectively invisible to the user of the client device, such as an image that is a single pixel in size.

At step 620, the web server may include a timer function associated with the tracking code of step 615, as described in greater detail above. As the webpage returned by the web server is to be only a transitory webpage that passes the client device on to the destination webpage, any significant delays may affect the user experience. For example, if the tracking handshake takes too long to complete, the user may notice, e.g., a blank browser window, and believe there to be an error. In various embodiments, the timer function may impose a maximum amount of time on the tracking code. For example, the timer function may repeatedly check to see whether the tracking handshake has complete (e.g., the browser received a successful tracking status notification). If so, the timer function may cause the browser to navigate to the destination webpage. Otherwise, if the timer function determines that the handshake has not completed within a threshold amount of time, the timer function may still cause the browser to navigate to the destination webpage without completing the tracking handshake.

At step 625, as detailed above, the web server may send the webpage data, including the tracking code and timer function, to the client device. In doing so, this will cause the requesting browser to perform a tracking handshake before navigating to the destination webpage in a manner that is transparent to the user. In addition, the timer function ensures that the user experience is not impinged by the tracking mechanism. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for techniques that allow for the recordation of online actions that may occur between webpages that are unaffiliated with the interested party. In some aspects, the techniques introduce a pass-through mechanism that operates between the source and destination webpages, allowing the interested party to record the online transaction. In further aspects, a mechanism is introduced to control the returned content, based on whether the request was initiated by a human user or by a bot. Additionally, the techniques herein introduce a timer function that preserved the user experience by limiting the amount of time spent on the intermediate webpage, regardless of whether a tracking handshake completed. As would be appreciated, the techniques herein differ significantly from other techniques, such as those that rely on HTTP redirect status codes (e.g., 301 redirects, 302 redirects, etc.), since the techniques herein actually render a pass-through webpage to facilitate recording of the online transaction.

While there have been shown and described illustrative embodiments, it is to be understood that various other adaptations and modifications may be made within the spirit and scope of the embodiments herein. For example, the embodiments have been shown and described herein with relation to certain network configurations and protocols. However, the embodiments in their broader sense are not as limited, and may, in fact, be used with other types computing/control networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a first server in a network and from a client device, a webpage request for a first webpage address of a first webpage served by the first server, wherein the first webpage address is associated with a second webpage served by a second server;
determining, by the first server, whether the received webpage request was generated by an automated bot;
including, by the first server, tracking code within data for the first webpage to record webpage transaction information for the client device;
including, by the first server, a timer function for the tracking code in the data for the first webpage; and
providing, by the first server, the data for the first webpage to the client device that includes the tracking code and the timer function, wherein the timer function causes the client device to render the second webpage in response to the tracking code receiving a successful tracking status notification or in response to the tracking code not receiving a successful tracking status notification within a threshold amount of time, wherein the first server provides the data for the first webpage to the client device in response to determining that the received webpage request was not generated by an automated bot.

2. The method as in claim 1, further comprising:
receiving, at the first server, a new link request that includes a second webpage address;
generating, by the first server, the first webpage address based on the second webpage address;
associating, by the first server, the first webpage address with the second webpage address; and
providing, by the first server, the first webpage address to a user interface.

3. The method as in claim 1, wherein determining whether the received webpage request was generated by an automated bot comprises:

receiving, by the first server, an indication that the received webpage request was generated by an automated bot from a user agent.

4. The method as in claim 1, further comprising:
including, by the first server, a bot check in the data for the first webpage, wherein the bot check is configured to control execution of the tracking code and timer function by the client device based on whether the bot check determines that the client device is operated by a bot.

5. The method as in claim 1, wherein the data for the first webpage comprises one or more metadata tags that simulate data of the second webpage.

6. The method as in claim 5, further comprising:
receiving, at the first sever, one or more edits to a representation of the second webpage from a user interface.

7. The method as in claim 1, wherein the second webpage comprises an embedded media file.

8. The method as in claim 1, wherein the tracking code comprises an instruction to load a pixel tag associated with a tracking cookie.

9. An apparatus, comprising:
one or more network interfaces to communicate with a computer network;
a processor coupled to the one or more network interfaces and configured to execute a process; and
a memory configured to store the process executable by the processor, the process when executed operable to:
receive a webpage request for a first webpage address of a first webpage served by the apparatus, wherein the first webpage address is associated with a second webpage served by a second server;
determine whether the received webpage request was generated by an automated bot;
include tracking code within data for the first webpage to record webpage transaction information for the client device;
include a timer function for the tracking code in the data for the first webpage; and
provide the data for the first webpage to the client device that includes the tracking code and the timer function, wherein the timer function causes the client device to render the second webpage in response to the tracking code receiving a successful tracking status notification or in response to the tracking code not receiving a successful tracking status notification within a threshold amount of time, wherein the apparatus provides the data for the first webpage to the client device in response to determining that the received webpage request was not generated by an automated bot.

10. The apparatus as in claim 9, wherein the process when executed is further operable to:
receive a new link request that includes a second webpage address;
generate the first webpage address based on the second webpage address;
associate the first webpage address with the second webpage address; and
provide the first webpage address to a user interface.

11. The apparatus as in claim 9, wherein the apparatus determines whether the received webpage request was generated by an automated bot by:

receiving an indication that the received webpage request was generated by an automated bot from a user agent.

12. The apparatus as in claim 9, wherein the process when executed is further operable to:
include a bot check in the data for the first webpage, wherein the bot check is configured to control execution of the tracking code and timer function by the client device based on whether the bot check determines that the client device is operated by a bot.

13. The apparatus as in claim 12, wherein the data for the first webpage comprises one or more metadata tags that simulate data of the second webpage.

14. The apparatus as in claim 13, wherein the process when executed is further operable to:
receive one or more edits to a representation of the second webpage from a user interface.

15. The apparatus as in claim 9, wherein the second webpage comprises an embedded media file.

16. The apparatus as in claim 9, wherein the tracking code comprises an instruction to load a pixel tag associated with a tracking cookie.

17. A tangible, non-transitory, computer-readable media having software encoded thereon, the software when executed by a processor of a first web server operable to:
receive, from a client device, a webpage request for a first webpage address of a first webpage served by the first web server, wherein the first webpage address is associated with a second webpage served by a second server;
include tracking code within data for the first webpage to record webpage transaction information for the client device;
include a timer function for the tracking code in the data for the first webpage;
include a bot check in the data for the first webpage, wherein the bot check is configured to control execution of the tracking code and timer function by the client device based on whether the bot check determines that the client device is operated by a bot; and
provide the data for the first webpage to the client device that includes the tracking code and the timer function, wherein the timer function causes the client device to render the second webpage in response to the tracking code receiving a successful tracking status notification or in response to the tracking code not receiving a successful tracking status notification within a threshold amount of time.

18. The computer-readable media of claim 17, wherein the software when executed is further operable to:
receive a new link request that includes a second webpage address;
generate the first webpage address based on the second webpage address;
associate the first webpage address with the second webpage address; and
provide the first webpage address to a user interface.

19. The computer-readable media of claim 17, wherein the data for the first webpage comprises one or more metadata tags that simulate data of the second webpage.

20. The computer-readable media of claim 19, wherein the software when executed is further operable to:
receive one or more edits to a representation of the second webpage from a user interface.

* * * * *